(12) United States Patent
Chavan et al.

(10) Patent No.: US 9,407,550 B2
(45) Date of Patent: Aug. 2, 2016

(54) METHOD AND SYSTEM FOR CONTROLLING TRAFFIC OVER A COMPUTER NETWORK

(75) Inventors: Mukund T. Chavan, Costa Mesa, CA (US); Parag Bhide, Costa Mesa, CA (US); Chaitanya Tumuluri, Costa Mesa, CA (US); Ravindra Sadanand Shenoy, Costa Mesa, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1276 days.

(21) Appl. No.: 12/277,211

(22) Filed: Nov. 24, 2008

(65) Prior Publication Data

US 2010/0128605 A1 May 27, 2010

(51) Int. Cl.
*H04L 12/801* (2013.01)
*H04L 12/851* (2013.01)
*H04L 12/825* (2013.01)

(52) U.S. Cl.
CPC .............. *H04L 47/10* (2013.01); *H04L 47/11* (2013.01); *H04L 47/2483* (2013.01); *H04L 47/263* (2013.01); *Y02B 60/31* (2013.01)

(58) Field of Classification Search
USPC ............ 370/229, 230, 230.1, 231–235, 252, 370/253, 465, 468
See application file for complete search history.

(56) References Cited

U.S. PATENT DOCUMENTS

| | | | |
|---|---|---|---|
| 7,668,087 B2* | 2/2010 | Hussain et al. | 370/230 |
| 7,738,376 B2* | 6/2010 | Balakrishnan et al. | 370/232 |
| 7,764,615 B2* | 7/2010 | Gilfix | 370/235 |
| 8,284,665 B1* | 10/2012 | Aybay | H04L 43/026 370/235 |
| 2008/0275975 A1* | 11/2008 | Pandey et al. | 709/223 |
| 2009/0116381 A1* | 5/2009 | Kanda | 370/229 |

* cited by examiner

*Primary Examiner* — Yemane Mesfin
*Assistant Examiner* — Mon Cheri Davenport

(57) ABSTRACT

A rate limiter incorporated in a server connected to a network. The rate limiter is adapted to reduce congestion in the network in response to a congestion notification message. The server is adapted to send packets over the network. The rate limiter includes at least one of: a server rate limiter engine adapted to rate limit the packets in response to the server; a virtual machine rate limiter engine adapted to rate limit the packets in response to a virtual machine associated with the packets, the virtual machine hosted by the server; a flow rate limiter engine adapted to rate limit the packets in response to a flow associated with the packets; the flow being one of a plurality of flows transporting packets over the network; and a transmit engine adapted to rate limit the packets in response to a virtual pipe of the network for transmitting the packets.

31 Claims, 8 Drawing Sheets

METHOD AND SYSTEM FOR CONTROLLING TRAFFIC OVER A COMPTUER NETWORK

FIELD OF THE INVENTION

This invention relates generally to traffic control in a computer network, and more specifically to rate limiting in response to congestion in the network.

BACKGROUND OF THE INVENTION

Network congestion can occur when too much data is sent through a particular link or node of a network. Such congestion may negatively affect the quality of service provided by the network. For example, it may cause queuing delays, packet losses, and blocked connections. Therefore, it is desirable to make sure that the amount of traffic passing through each node of the network does not exceed what the node can handle.

A typical scenario of network congestion is illustrated in FIG. 1. As illustrated, the network includes two servers A and B 100, 102, a switch 104, and two disks T1 and T2 108, 110. The number of devices shown in FIG. 1 is limited for illustration purposes only. Additional servers, switches, disks, and other types of devices may be connected to the network. Both servers A and B 100, 102 and both disks T1 and T2 108, 110 are connected to the switch 104 by 10 Gbps Ethernet cables. This setup allows the servers A and B 100, 102 to communicate with each of the disks T1 and T2 108, 110 via the switch 104. In this exemplary network, when servers A and B 100, 102 simultaneously attempt to send 10 gigabytes of data over the Ethernet cable to disk T1 108, the switch 104 may experience congestion because there will be a total of 20 gigabytes of incoming data from the two servers A and B 100, 102 while the switch only has a 10 gigabyte outgoing connection to disk T1 108. As a result, not all packets received by the switch 104 can be forwarded to disk T1 108 right away. Some of the packets may have to be temporarily stored in a buffer of the switch before they can be forwarded to disk T1 108. If there is not enough space in the buffer, the switch 104 may be forced to drop some of the packets without forwarding them to the destination disk T1 108. In certain types of networks, depending on the network protocol used, dropping packets may potentially cause the whole data flow to be terminated and all packets to be retransmitted. This may result in significant performance degradation and network delay, particularly when the network is handling a large data transfer.

To reduce the negative effects of congestion on a network, one solution is to design the switch 104 so that it can notify the source of a transmission (e.g., servers A and B 100, 102 in FIG. 1), when congestion is detected, to enable the source to reduce its output before the switch 104 runs out of buffer space. This would guarantee efficient system behavior by preventing packets from being dropped and, at the same time, generating a predictable performance for applications running on servers A and B 100, 102.

Some of the current network protocols have built-in mechanisms to respond to congestion. For example, if the TCP protocol is used by the network of FIG. 1, the servers A and B 100, 102 may reduce their outgoing bandwidth by half when they detect that the downstream switch 104 is experiencing congestion and dropping packets. After their output is cut in half in response to the congestion, the servers 100, 102 may then gradually increase output based on existing congestion control mechanisms, such as TCP congestion control. In response to the second notice, the servers 100, 102 again would reduce their output by half. This process may be repeated until no further congestion notices are received or all packets are successfully transmitted. However, this may not be the optimal solution for the applications running on the servers 100, 102 because there may be bandwidth not utilized when both servers 100, 102 reduce output by half.

Therefore, it is desirable to have a better way for the switch (or any other target device of a network communication) to notify the source about downstream congestion in the network so that the source can reduce its output by halting the transmission of packets. Other known solutions for preventing congestion in a network involve the use of rate limiters to control individual flows from the reaction points (i.e., the source of the transmission) that are causing congestion. This usually requires that the congested node send a backwards congestion notification (BCN) to the source of the transmission (e.g., the servers in FIG. 1). After receiving the BCN message, the source may provide relief by rate limiting the outgoing packets to reduce congestion. (See U.S. Patent Application No. 2006/0203730 to Zur). One example of rate limiters on the transmission source is introduced in U.S. Pat. No. 7,106,696 to Lim et al.

However, none of the existing rate limiters provide software and firmware adjustable controls over the congestion by selectively rate limiting outbound traffic on a packet level. In addition, none of the existing rate limiters selectively limit packets based on the flows, virtual machines, and blade servers associated with the outgoing packets.

SUMMARY OF THE INVENTION

Embodiments of the rate limiter disclosed in this invention are implemented by the operation of one or more of a rate limiter engine for flows, a rate limiter engine for virtual machines, and a rate limiter engine for blade servers in a system that shares the same CNA or network access. In addition, another level of rate limiting based on the priority assigned to each packet and the corresponding virtual pipes in which the packets are transmitted may also be included. The flow rate limiter engine, the virtual machine rate limiter engine, and the blade server rate limiter engine may be coupled to the profile table registers that have entries corresponding, respectively, to the different flows, virtual machines, and blade servers. Each profile table may have multiple entries, some of which being set by an external firmware or software as an allocated rate for a particular flow, virtual machine, or blade server, and other entries being set in response to the instant rate of packet traveling over the network as the current rate corresponding to the flow, virtual machine, or blade server. By comparing the allocated rate to the current rate of a flow, a virtual machine or a blade server, the flow rate limiter engine, the virtual machine rate limiter engine, and the blade server rate limiter engine may determine whether candidate packets in queue for outbound transmission should be sent or withheld.

The use of separate rate limiter engines and profile tables with individualized allocations for each flow, virtual machine, and blade server provides an important advantage in the architecture of the ASIC, in that software or firmware can separately set the allocations. In one embodiment, a processor is only used to set initial allocations for the virtual machines, flows, and blade servers. All other operations of the rate limiter are performed by hardware. As such, the verification can be done in a short amount of time and does not negatively affect the performance of the host device.

In addition, the rate limiting features provided by embodiments of the invention allow the network to maintain a high throughput by keeping the number of dropped packets low. By identifying the flow, virtual machine, and/or blade server responsible for congestion in the network, the disclosed rate limiter is able to selectively control traffic based on the flow, the virtual machine, and/or the blade server so that flows, virtual machines, and blade servers not responsible for the congestion are not interrupted. In other words, limitations may be selectively placed, through software or firmware, on traffic for particular flows, virtual machines, and/or blade servers to accomplish network objectives under congested conditions.

DETAILED DESCRIPTION OF THE PREFERRED EMBODIMENTS

Figure 1:
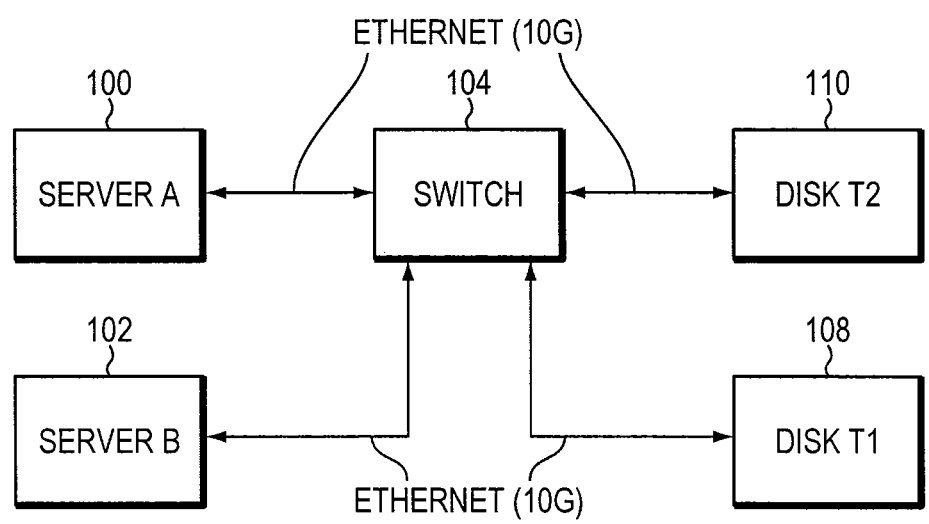
FIG. 1 is a block diagram illustrating a typical Ethernet network that may experience congestion in one of its switches.

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Although the idea of rate limiting packets issuing from a network port in response to congestion notification messages (e.g., BCN—backwards congestion notification) is well known, embodiments of the present invention disclose a distinct hardware-based rate limiter that can react to a BCN by loading (from firmware or software) rate allocations into profile table entries of registers in an application-specific integrated circuit (ASIC). The profile tables may also include entries loaded from hardware reflecting the current traffic rate in the network. The rate limiter may be embedded in a network device (e.g., a host bus adaptor (HBA), a converged network adapter (CNA) or a network interface card (NIC)) that provides software and firmware adjustable controls over the downstream congestion created by packets sent out from a network port (e.g., FC, 10GbE, or FCoE port) of the network device.

In particular, embodiments of the rate limiter disclosed in this invention are implemented by the operation of one or more of a rate limiter engine for flows, a rate limiter engine for virtual machines, and a rate limiter engine for blade servers in a system that shares the same CNA or network access. In addition, another level of rate limiting based on the priority assigned to each packet and the corresponding virtual pipes in which the packets are transmitted may also be included. The flow rate limiter engine, the virtual machine rate limiter engine, and the blade server rate limiter engine may be coupled to the profile table registers that have entries corresponding, respectively, to the different flows, virtual machines, and blade servers. Each profile table may have multiple entries, some of which being set by an external firmware or software as an allocated rate for a particular flow, virtual machine, or blade server, and other entries being set in response to the instant rate of packet traveling over the network as the current rate corresponding to the flow, virtual machine, or blade server. By comparing the allocated rate to the current rate of a flow, a virtual machine or a blade server, the flow rate limiter engine, the virtual machine rate limiter engine, and the blade server rate limiter engine may determine whether candidate packets in queue for outbound transmission should be sent or withheld.

The use of separate rate limiter engines and profile tables with individualized allocations for each flow, virtual machine, and blade server provides an important advantage in the architecture of the ASIC, in that software or firmware can separately set the allocations. In one embodiment, a processor is only used to set initial allocations for the virtual machines, flows, and blade servers. All other operations of the rate limiter are performed by hardware. As such, the verification can be done in a short amount of time and does not negatively affect the performance of the host device.

In addition, the rate limiting features provided by embodiments of the invention allow the network to maintain a high throughput by keeping the number of dropped packets low. By identifying the flow, virtual machine, and/or blade server responsible for congestion in the network, the disclosed rate limiter is able to selectively control traffic based on the flow, the virtual machine, and/or the blade server so that flows, virtual machines, and blade servers not responsible for the congestion are not interrupted. In other words, limitations may be selectively placed, through software or firmware, on traffic for particular flows, virtual machines, and/or blade servers to accomplish network objectives under congested conditions.

Figure 2:
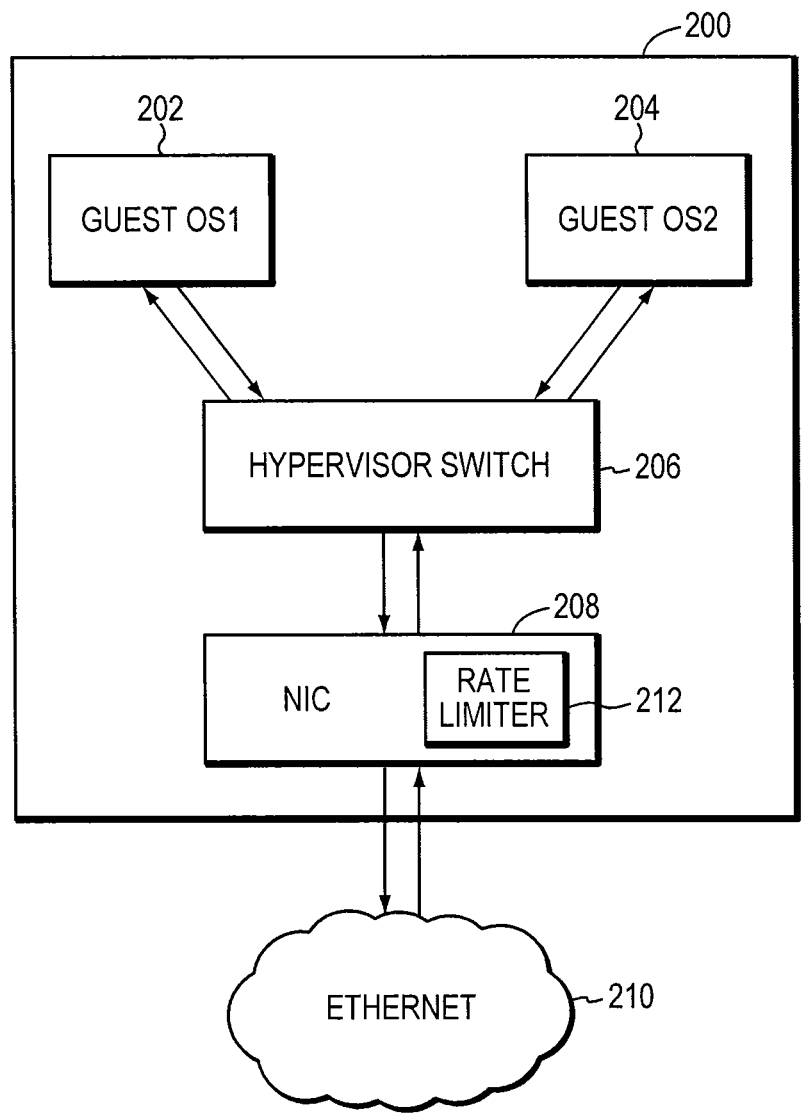
FIG. 2 illustrates an exemplary server hardware including a network interface card (NIC) that embeds an embodiment of the rate limiter of the present invention.

FIG. 2 illustrates a server incorporated with an embodiment of the rate limiter disclosed herein. The server may be one of the servers in FIG. 1. In one embodiment, the server may be one of a plurality of blade servers residing in a blade server chassis. Referring to FIG. 2, the server 200 includes multiple guest operating systems (OS) 202, 204, a hypervisor 206, and a network card 208. In addition, the server 200 may include a central processing unit (CPU) and one or more memory units (e.g., random access memory (RAM)), which are omitted from the figure for clarity purpose. The guest OSs may be any of the existing operating systems, such as Windows or Linux, each running one or more applications. Each of the guest OSs 202, 204 may run on an independent virtual machine (not shown). Although only two guest OSs 202, 204 are shown in FIG. 2, more can be included in the server 200. In one embodiment, the server 200 is adapted to host as many as 128 virtual machines.

Each of the guest OSs 202, 204 is connected to the hypervisor 206. The hypervisor 206 abstracts the underlying hardware of the server 200 from the guest OSs 202, 204 and time-shares the CPU between the guest OSs 202, 204. The hypervisor 206 may also be used as an Ethernet switch to switch packets between the guest OSs 202, 204. The hypervisor 206 is connected to the network card 208. The network card 208 can be viewed as an uplink port to the hypervisor 206 and also a downlink port to the physical Ethernet network 210. In various embodiments, the network card 208 may be a HBA, a CNA, or a NIC.

Because there is no direct communication between the guest OSs 202, 204 and the hypervisor 206 allows each guest OS to operate without being aware of the other guest OS(s), each guest OS may think that it is the only OS in the server and may not know that it is sharing the CPU and other resources with other guest OSs in the server. As a result, the guest OSs 202, 204 may overload the network by sending out packets at the same time that require the full bandwidth of the network to transfer. This could potentially trigger congestion in a downstream device as illustrated in FIG. 1.

Figure 3:
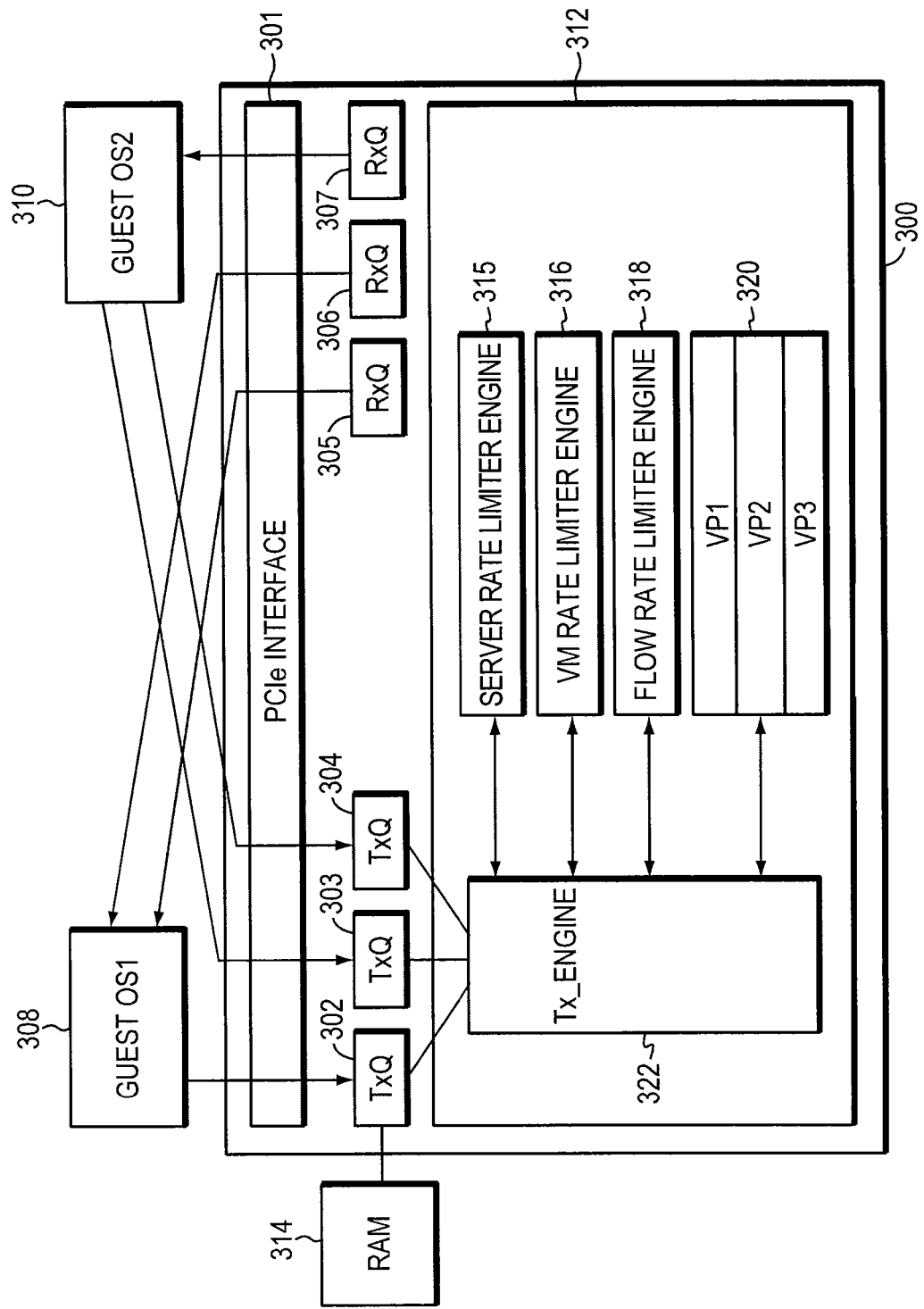
FIG. 3 illustrates an exemplary network interface card (NIC) including a rate limiter according to the embodiments of the present invention.

In response to a BCN, an embodiment of the disclosed rate limiter may be incorporated in the server to perform multi-level rate limiting to control the outflow of packets from the server. In one embodiment, the rate limiter 212 may be incorporated in the network card 20. FIG. 3 provides a closer look at the network card 208 including an embodiment of the rate limiter 212.

As illustrated in FIG. 3, the network card 300 may include a PCI express (PCIe) interface 301, a number of transmit queues (TxQ) 302, 303, 304 and receive queues (RxQ) 305, 306, 307. Although three TxQs 302, 303, 304 and three RxQs 305, 306, 307 are shown in FIG. 3, any number of TxQs and RxQs may be included in the network card 300. In addition, the number of TxQs and the number of RxQs do not have to be the same, and can be completely arbitrary. In this embodiment, one of the TxQs 302 is exposed to a first guest OS 308 in the server through the PCIe interface 301. The other two TxQs 303, 304 are in communication with a second guest OS 310 in the server, also through the PCIe interface 301. On the receiving side, two of the RxQs 305, 306 are linked to the first guest OS 308 and the other one is connected to the second guest operating system 310. As such, the number of TxQs mapped to a guest OS does not have to match the number of RxQs mapped to the same guest OS.

Each TxQ 302, 303, 304 and RxQ 305, 306, 307 represents a virtual adaptor for its corresponding guest OS 310, 312 and enables the guest OSs 310, 312 to transmit and receive packets from the external Ethernet network. If an application running on the first guest OS 308 makes a request to transmit a packet to a destination device on the network, a transmit descriptor (TD) is prefetched into the TxQ 302 which is mapped to the first guest OS 308. The TD points to an address in the RAM 314, where the packet is stored. In addition, the TD may include other information about the packet that may be useful in the rate limiting process described below.

Figure 4:
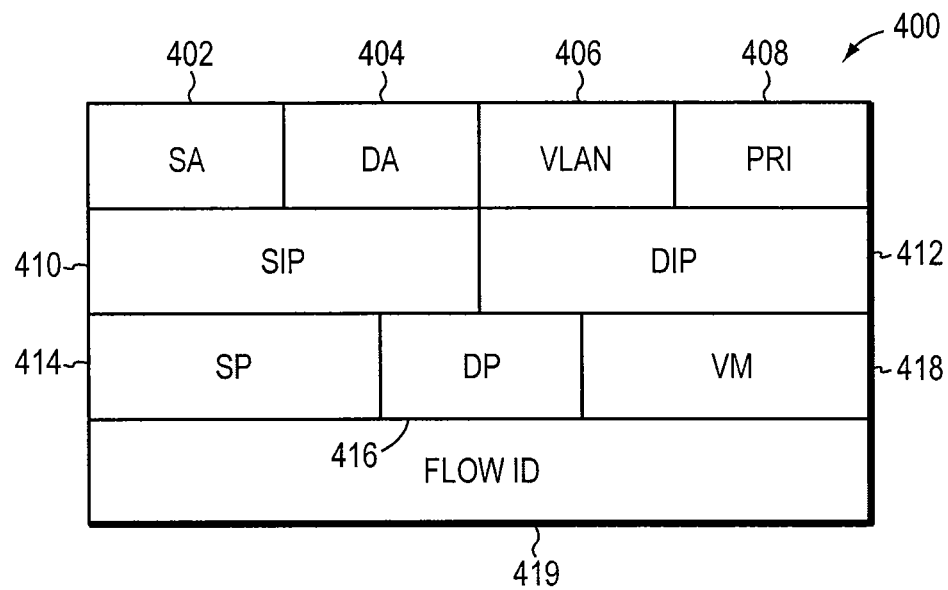
FIG. 4 illustrates the structure of a typical transmit descriptor (TD) used in embodiments of the present invention.

FIG. 4 illustrates the structure of an exemplary TD 400. As illustrated, the typical TD may include a MAC source address (SA) 402, a MAC destination address (DA) 404, a virtual LAN number (VLAN) 406, a priority field (PRI) 408, a source IP address (SIP) 410, a destination IP address (DIP) 412, a source port (SP) 414, a destination port (DP) 416, a virtual machine ID (VM) 418, and a flow ID 419. In one embodiment, the flow ID 419 may be populated by an entity such as an application or a driver. In another embodiment, the flow ID 419 can be a property of one or more TxQs 302. During the rate limiting process, a combination of some or all of these fields may be used to identify the virtual machine and flow associated with the packet to be transmitted. However, it is not required that a TD includes all these fields for the disclosed rate limiter to operate. If the TD does not contain all the necessary information required by the rate limiter, the packet may have to be extracted from the RAM 314 and staged on the network card before rate limiting can take place. This extra step allows the rate limiter to obtain the information directly from the packet.

Referring back to FIG. 3, the hardware-based rate limiter 312 includes a transmit engine (Tx_Engine) 322 that receives the TDs from the TxQs 302, 303, 304 in the server. In this embodiment, the Tx_Engine 322 manages four different levels of rate limiting structures in the rate limiter 312. The combination of the structures controls the outbound traffic to minimize latency and reduce congestion in the network. As illustrated, in the top level, a blade server rate limiter engine (Server_RL_Engine) 315 verifies whether a transmission of packets is within the rate limit assigned to the host blade server. In the second level, a virtual machine rate limiter engine (VM_RL_Engine) 316 determines whether transmitting packets requested by a particular guest OS running on a corresponding virtual machine would exceed the rate limit allocated to that virtual machine. In the third level, a flow is identified of which the packets will be transmitted as a part. Flows are selectable grouping of packets based on flow IDs generated as a hash of selected packet header fields. In one embodiment, the rate limiter is designed to work with as many as 1024 flows. In the next step, a flow rate limiter engine (DCE_Engine) 318 verifies that there is no congestion problem associated with that identified flow. In the last of the four levels, the rate limiter 312 identifies a virtual pipe 320 in the physical network that the packets will traverse. The rate limiter 312 then verifies whether the virtual pipe 320 has enough bandwidth left to handle the transmission of the packets. A detailed description of virtual pipes is provided later in this document. In this embodiment, the packets have to pass all four levels of rate limiting before they can be sent out by the server over the network wire. The steps of rate limiting using the rate limiter 312 of FIG. 3 are provided in the following paragraphs in view of FIG. 5.

Figure 5:
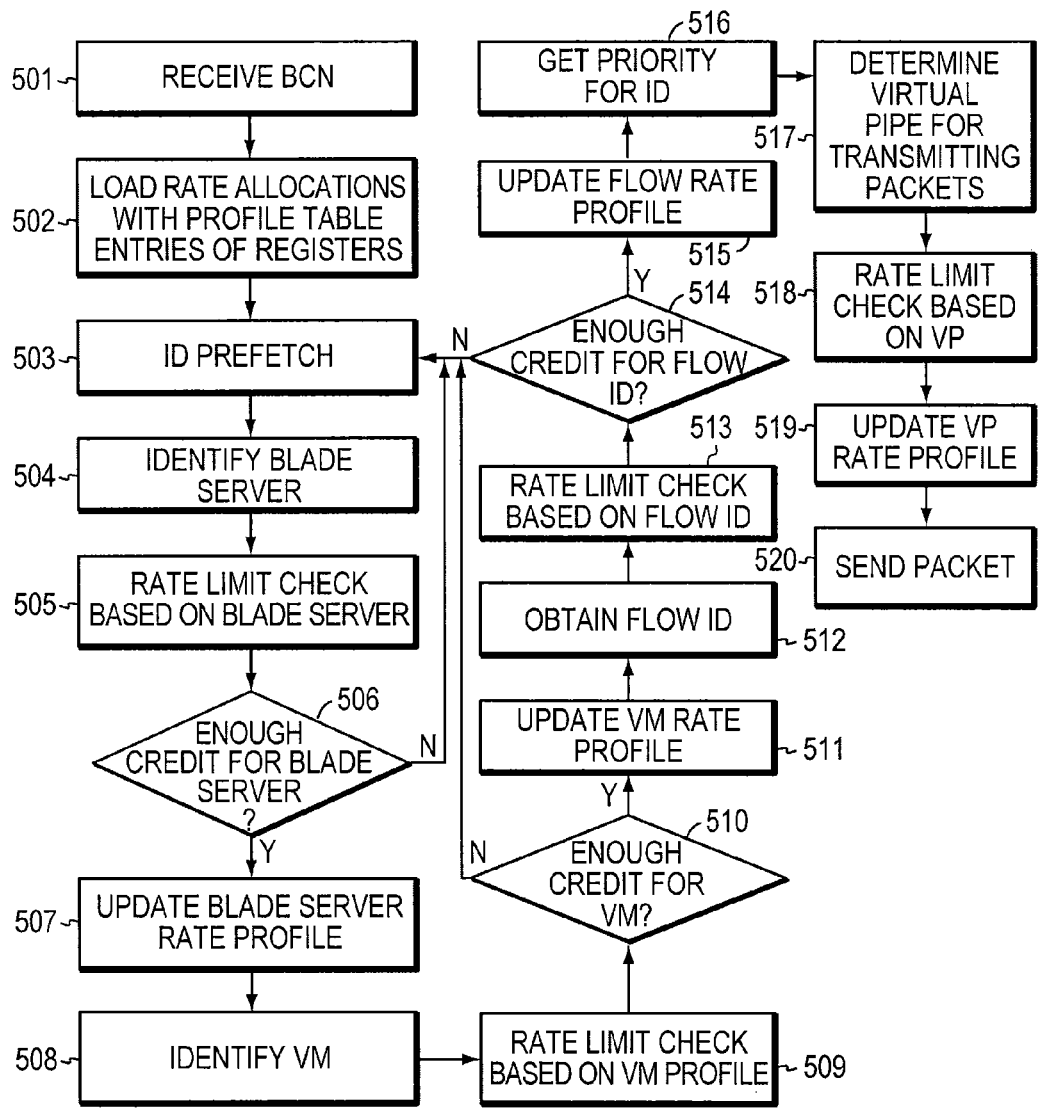
FIG. 5 is a flow chart illustrating the exemplary steps in the rate limiting process according to an embodiment of the invention.

In operation, the rate limiters can be designed to react to congestion notification messages (e.g., BCN). Referring now to FIG. 5, upon receiving a BCN message at the server (step 501), the rate limiter loads rate allocations for each virtual machine, flow, and blade server into respective profile table (step 502). In addition, the profile table also may include entries reflecting the current rate associated with each virtual machine, flow, and blade server. In one embodiment, the profile table may be loaded prior to receiving a BCN. Next, TDs identifying candidate packets for transmission are prefetched to one of the TxQs (step 503). The transmit engine (Tx_Engine) then selects one of the TxQs for transmitting based on a predetermined algorithm and initiates the rate limiting process using the information stored in the corresponding TD.

In this embodiment, the Tx_Engine first identifies the blade server (step 504) and performs a rate limit check based on the identified blade server (step 505). In particular, the Tx_Engine queries the server rate limiter engine (Server_RL_Engine) for the availability of credits for the identified blade server. In one embodiment, this is done by having the Server_RL_Engine access a profile table that includes entries specifying the allocated bit rate and the current transmission rate associated with the particular blade server. The current transmission rate is determined by the transmitted byte count within a predefined time interval. In one embodiment, if the number of bytes transmitted is below the limit for predefined time interval, the unused time left from a time interval may be carried over to the next time frame. However, a limit may be imposed as to for how long this carry-over is allowed.

By comparing the allocated bit rate with the current rate, the Server_RL_Engine can determine whether there is any credit left for transmitting the packets identified by the TD (step 506). If the number of credits available for this particular blade server is not enough for transmitting the packets, the Tx_Engine may postpone sending the packets and proceed with processing TDs for other TxQs. In that case, traffic from this blade server is stalled until enough credits are replenished in the profile table. In contrast, if there are enough credits available for the particular blade server, the Tx_Engine may proceed to perform the next rate limit check. Accordingly, the profile table including the allocated and current transmission rate of the blade servers may be updated to reflect the change in available credits for the particular blade server (step 507).

Next, the Tx_Engine extracts the virtual machine ID (VM ID) from the TD. In another embodiment, the VM ID can be determined from a profile that maps the TxQ to the VM. Once the VM ID is obtained, the Tx_Engine uses the VM ID to identify the virtual machine corresponding to the TD (step 508). Then, the Tx_Engine queries the virtual machine rate limiter engine (VM_RL_Engine) for the availability of credits for the identified virtual machine (step 509). In one embodiment, this is done by having the VM_RL_Engine access a profile table that includes entries specifying the allocated bit rate and the current transmission rate associated with the particular virtual machine. The current transmission rate is determined by the transmitted byte count within a predefined time interval. In one embodiment, if the number of bytes transmitted is below the limit for predefined time interval, the unused time left from a time interval may be carried over to the next time frame. However, a limit may be imposed as to for how long this carry-over is allowed.

By comparing the allocated bit rate with the current rate, the VM_RL_Engine can determine whether there is any credit left for transmitting the packets identified by the TD (step 510). If the number of credits available for this particular virtual machine is not enough for transmitting the packets, the Tx_Engine may postpone sending the packets and proceed with processing TDs for other TxQs. In that case, traffic from the first virtual machine is stalled until enough credits are replenished in the profile table. In contrast, if there are enough credits available for the particular virtual machine, the Tx_Engine may proceed to perform the next rate limit check. Accordingly, the profile table including the allocated and current transmission rate of virtual machines may be updated to reflect the change in available credits for the particular virtual machine (step 511).

The next rate limit check in this embodiment is based on the flow associated with the packets that may be transferred. In order to perform the flow rate limit check, the Tx_Engine first has to identify a flow ID again from information available in the TD (step 512). As previously discussed, the TD points to a packet that resides in the memory and ready to be transmitted. The TD typically does this by using a pointer pointing to a memory address in the CPU's memory space. The flow ID can be based on information extracted from the TD, given all necessary information is available in the TD. For example, the flow ID may be determined by a combination of SA, DA, and PRI, in one embodiment. Alternatively, the flow ID can be obtained from the CPU's memory space of the host memory over the PCIe and stored in the internal buffer RAM. Since all the information in TD requires relatively large space to store, (e.g., 48 bits for SA, 48 bits for DA, 12 bits for VLAN, 32 bits for SIP, and 128 bits for DIP, respectively), a hash is often used to reduce the amount of buffer space needed. One downside of using a hash is the possibility of having collisions between multiple entries hashed to the same index. Collisions may cause flows that are allocated to the same index in the hash to be rate limited regardless of whether they are actually associated with the TD. However, because the benefit of hashing may overwhelmingly surpass the penalties it causes, flow IDs are preferably hashed.

Once a packet is mapped to a flow ID, the Tx_Engine instructs the DCE_Engine to verify whether this flow is rate limited by either the network or by the end point (the target device). If it is, the DCE_Engine takes a step further to determine the availability of credits for the identified flow (step 513). Similar to the credit availability check for virtual machine, the DCE_Engine also accesses a profile table containing data related to each flow. It queries the profile table to obtain the allocated flow rate and the current rate of the flow identified by the flow ID. If the allocated flow rate is exceeded by the current rate, the server may have to hold on to the packets until the next time interval when enough credits are available for transmitting the packets (step 514). If the current rate of pass of the flow is less than the allocated flow rate, there are enough credits left for this particular flow to handle more packets. That is, sending the packets as a part of this flow likely will not cause congestion in a downstream device. When the number of bytes left to be transmitted is fewer than the credits available for the flow, those bytes are always sent regardless of whether all the available credits are needed for the transmission. For example, if the rate limit is 1000 bytes in a particular time interval and there is only one byte left to be sent in a 64-byte packet, the server still sends the single byte because if it is not sent, the packet may have to be dropped and the whole transmission process has to be restarted when there are enough credits available the next time around. By sending the one byte, the rate limit for that flow increases by 63 bytes which were not used in the transmission of the single byte. In the next time interval when credits are replenished for this flow, only 937 bytes (i.e., 1000-63), instead of whole 1000 bytes, are needed. This way, the rates are kept the same on average from one time interval to the next. Depending on whether the packets are to be transmitted, the profile table including the allocated and current transmission rate of the flows may be updated to reflect the change in available credits for the particular flow (step 515).

Figure 6:
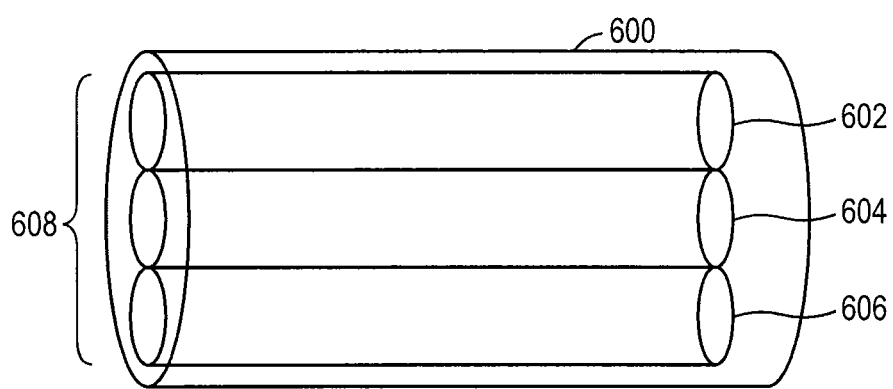
FIG. 6 illustrates a section of an exemplary physical wire carved into multiple virtual pipes.

If the rate limiter determines that there are enough credits for the flow to send the packets, it then has to determine which virtual pipe the packets will traverse and whether that virtual pipe has sufficient bandwidth to handle the packets. In a typical network, one or more virtual pipes can be carved out from the physical network cable (i.e., pipe). FIG. 6 illustrates a physical cable 600 that is carved into 3 separate virtual pipes (i.e., VP1, VP2, VP3) 602, 604, 606. Typically, the sum of the bandwidths of the individual virtual pipes equals to the total bandwidth of the physical cable. In this example, the physical cable 600 may have a bandwidth of 10 gigabytes. VP1 602, VP2 604, and VP3 606 may have bandwidths of 5 gigabytes, 3 gigabytes, and 2 gigabytes, respectively. As such, the total bandwidth of VP1, VP2 and VP3 602, 604, 606 is the same as the network bandwidth. In other embodiments, it is also possible that the aggregated bandwidth of the individual virtual pipes (e.g., VP1, VP2, and VP3) may exceed the bandwidth of the physical wire (i.e., the link may be over-subscribed). The bandwidth of each virtual pipe is uniform across the whole length of the physical wire so that there are no mismatched bandwidths between two different sections of the network. Based on their bandwidths, the virtual pipes 602, 604, 606 may be assigned with different priorities that determine the type of data being transmitted through them.

Naturally, the data transfers that require the most amount of bandwidth are set to go on the virtual pipe with the most bandwidth. However, in one embodiment, low, medium and high priorities are assigned to the virtual pipes based on the latency requirements of the packets traversing the pipes. In the example illustrated in FIG. 6, VP1 602 with 5 gigabytes of bandwidth may be assigned to the lowest priority. VP2 604 may handle medium priority traffic. VP3 606 with 2 gigabytes of bandwidth may be the high priority virtual pipe. Accordingly, if an application on the server is sending data that does not require a whole lot of bandwidth, but is very latency sensitive, the data is deemed high priority and will be transmitted immediately over VP3 606. In contrast, a data transfer that may require a lot of bandwidth but may not be latency sensitive would use VP1 602 instead so that the data can be sent at a slower speed. One example of high priority, latency sensitive data is audio data which has to be transferred with minimum delay and without any packets being dropped because human ears are sensitive to any type of latency when listening to a clip of an audio file. In contrast, video data is less latency sensitive because dropping one frame in a video does not significantly affect human perception of the video. Therefore, audio data is likely to be transmitted in VP1 602 and video data in VP3 606, in this embodiment.

There may be an additional VP4 608 that consumes the whole bandwidth of the physical wire, (e.g., 10 gigabyte in the example shown in FIG. 6) and is assigned to handle data transfers having the highest priority. It is designed to allow the most latency sensitive packets to take over all the available bandwidth of the physical wire. However, when VP4 608 is occupied with data traffic, data traffic through VP1, VP2, and VP3 has to be halted because there is no bandwidth left in the physical wire to handle any other traffic. In another embodiment, the most latency sensitive packets, which may be identified by a unique bit in the corresponding TD, may not be subjected to any of the rate limiting mechanisms disclosed herein. That is, the rate limit engines may be disabled for the most latency-sensitive packets.

Provided with the above description of virtual pipes, it is important that various types of data are transferred over the proper virtual pipe so that latency sensitive traffic does not have to share the same virtual pipe with less important traffic. The last rate limit check performed by the disclosed rate limiter makes sure that the virtual pipe selected for a data transfer has enough bandwidth to handle the packets and not to create any congestion in the network.

It is also important to note that the virtual pipe carving has to extend all the way into the server to allow packets with different priorities to be placed in the proper virtual pipe for transmission. Referring back to FIG. 5, to map the packets to a virtual pipe, the priority of the packets is extracted from the PRI field of the TD (step 516) and used to obtain the corresponding virtual pipe (step 517). In one embodiment, there may be 8 different priorities per port, each priority matched to one of the virtual pipes in the network. A profile table may be used to store and describe each of the priorities. Once the virtual pipe is determined, the Tx_Engine checks if the selected virtual pipe has enough bandwidth for the packets (step 518). This can be done by comparing the bandwidth required to transmit the packets based on the size of the packets with the bandwidth available in the virtual pipe. In one embodiment, a profile table including the allocated and current transmission rates of virtual pipes may be updated to reflect the change in available bandwidth for the particular virtual pipe (step 519). If there is enough bandwidth, the packets are extracted from the RAM and put in the virtual pipe for transmission (step 520). Otherwise, the packets may be transmitted in a later time when additional bandwidth is freed up in the virtual pipe. It is also possible that the packet may simply be dropped if the server needs to free up some of the transmit buffers.

Each of the above discussed four levels of rate limiting (i.e., blade server, virtual machine, flow, and virtual pipe) is implemented in the NIC hardware. Because each level of rate limiting represents a different state, the four levels may be embodied in four different pieces of hardware. In other embodiments, all four may be implemented in one rate limiter engine.

One of the advantages realized by the four-level rate limiting process is that only the particular blade server, flow, or virtual machine causing the congestion is rate limited, while packets associated with other blade server, flows, or virtual machines are not. That is, selective limitations may be placed on traffic for particular blade servers, flows, and virtual machines to accomplish network objectives under congested conditions. The four rate limiting structures (blade server, virtual machine, flow, and virtual pipe) are designed to rate limit packets based on different aspects of the network. At the same time, the operation of one structure may affect the operation of the other ones. For example, the flow rate limit is controlled dynamically based on the state of the network. Multiple flows may share the same virtual pipe. Multiple packets originated from different virtual machines may be mapped to the same flow as a result of the use of a hash as previously mentioned. As such, as soon as congestion is detected, the flow that brings in the next packet may be rate limited. In this case, regardless of which virtual machine actually contributed packets to the flow, all traffic in that particular flow is rate limited. Similarly, it does not matter if the virtual pipe carrying the flow still has bandwidth left in it, the flow has to be rate limited once it is determined that the flow is responsible for the congestion.

As previously mentioned, the order in which the four levels of rate limiting (i.e., blade server, virtual machine, flow, and virtual pipe) are performed by the disclosed rate limiter can vary from one embodiment to another. FIG. 5 illustrates one example of how the rate limiter may function. In another embodiment, virtual pipe rate limiting may be carried out first, prior to blade server, virtual machine, and flow rate limiting. The reason for programming the rate limiter to execute in this order is that if there is not enough bandwidth in the virtual pipe, there would not be a need to run the blade server, virtual machine, and flow rate checks. The candidate packet will not be sent regardless of whether it passes the blade server, virtual machine, and the flow rate limiter engines. Since determining which virtual pipe the packet will use and whether that virtual pipe has enough bandwidth does not usually require a lot of processing power, by executing the rate limit checks in this order (i.e., virtual pipe first), the only time the blade server rate limit, the virtual machine rate limit, and the flow rate limit come into play is when it is certain that the virtual pipe has enough bandwidth to handle the packets. In one embodiment, if the priority of the packet dictates that the packet be sent via VP4, the virtual pipe encompassing the full bandwidth of the physical wire, the packets only have to pass the other two rate limit checks before being sent out. In another embodiment where the physical wire is not carved into different virtual pipes, only blade server, virtual machine, and flow based rate limiting are performed. In yet another embodiment where the server only hosts one OS, only blade server based, flow based, and virtual pipe based rate limiting are performed. In yet another embodiment where the server is a standalone server (e.g., not one of the multiple blade servers in a blade server chassis), only virtual machine based, flow based, and virtual pipe based rate limiting are performed. In general, each of the rate limiter engines (e.g., the server rate limiter engine, the virtual machine rate limiter engine, the flow rate limiter engine, and the virtual pipe rate limiter engine) may be implemented individually or in combination with one or more of the other rate limiter engines to provide the desired rate limiting capability for the network. In the embodiments where multiple rate limiter engines are included, each of the rate limiter engines may be selectively enabled or disabled.

Figure 7:
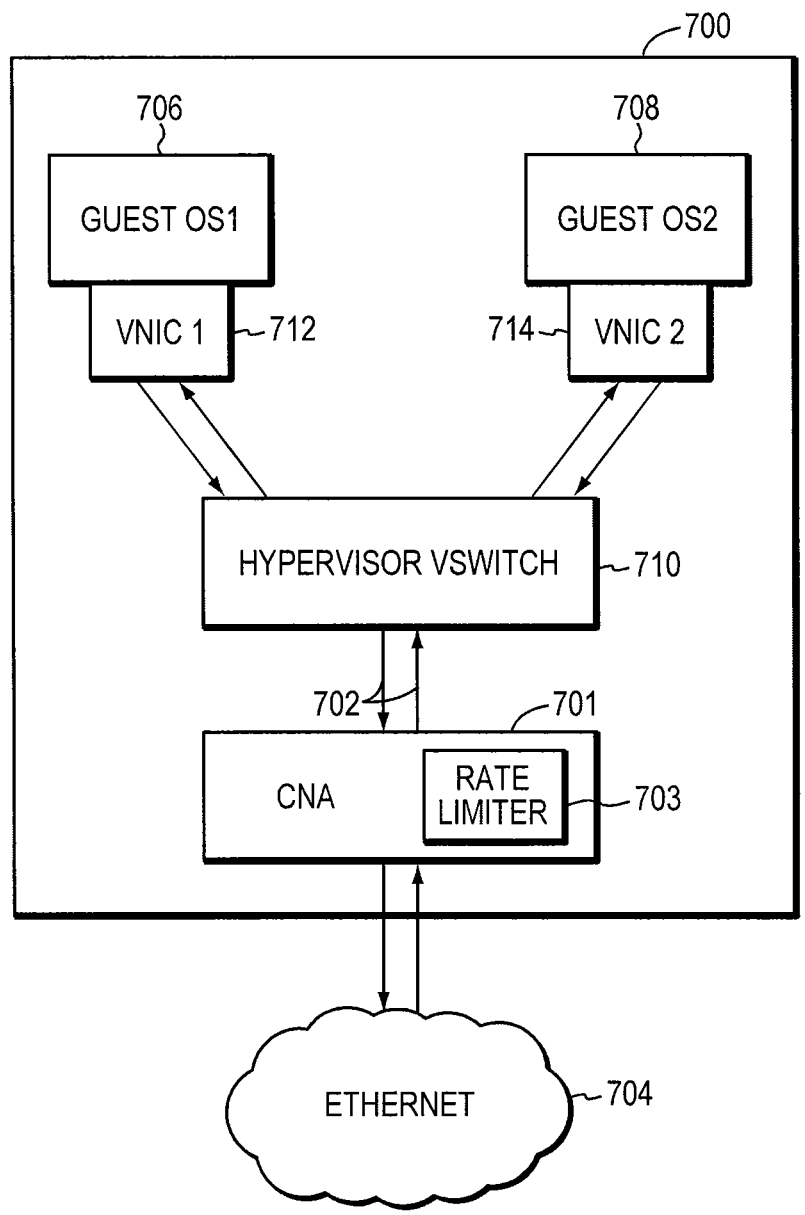
FIG. 7 illustrates a CNA including a rate limiter according to embodiments of the present invention.

As mentioned above, embodiments of the rate limiter disclosed in the invention may be incorporated in an HBA, a CNA, a physical network interface card (pNIC), or other suitable network cards. FIG. 7 illustrates a server 700 including an embodiment of the rate limiter 703 as a part of a CNA 701. The CNA 701 of FIG. 7 may be a single integrated chip which connects to a PCIe bus 702, and sends and receives Fibre Channel over Ethernet (FCoE) packets on a 10 Gbps Ethernet port (10GbE) 704. Similar to the server of FIG. 2, the server of FIG. 7 also includes multiple guest OSs 706, 708, each of which is connected to a hypervisor 710 using a virtual NIC (vNIC) 712, 714. The hypervisor switch 710 serves as the link between the guest OSs 706, 708 and the CNA 701. As in other embodiments, the rate limiter 703 responds to BCNs by selectively control traffic from the server to prevent congestion on other parts of the network to which the 10GbE port 704 is connected. BCNs or other congestion notification messages are received through the 10GbE port 704, and then by firmware inside the CNA 701, and possibly by software drivers inside one or more of the guest OSs 706, 708 or software drivers inside the hypervisor 710 (the software which contains the HyperVisor vSwitch and the vNICs 712, 714). The rate limiter 703 contains profiles with entries for rate allocations based on the software and firmware processing of the congestion notifications. The profiles have entries for each flow and each virtual machine which hosts the guest OSs. The rate limiter 703 may employ a similar rate limiting process as the one described above in view of FIG. 5. In another embodiment where the server 700 only runs one operating system (i.e., no multiple guest OSs), the hypervisor 710 may be eliminated and the rate limiter may perform flow based rate limiting, but not virtual machine based rate limiting.

Figure 8:
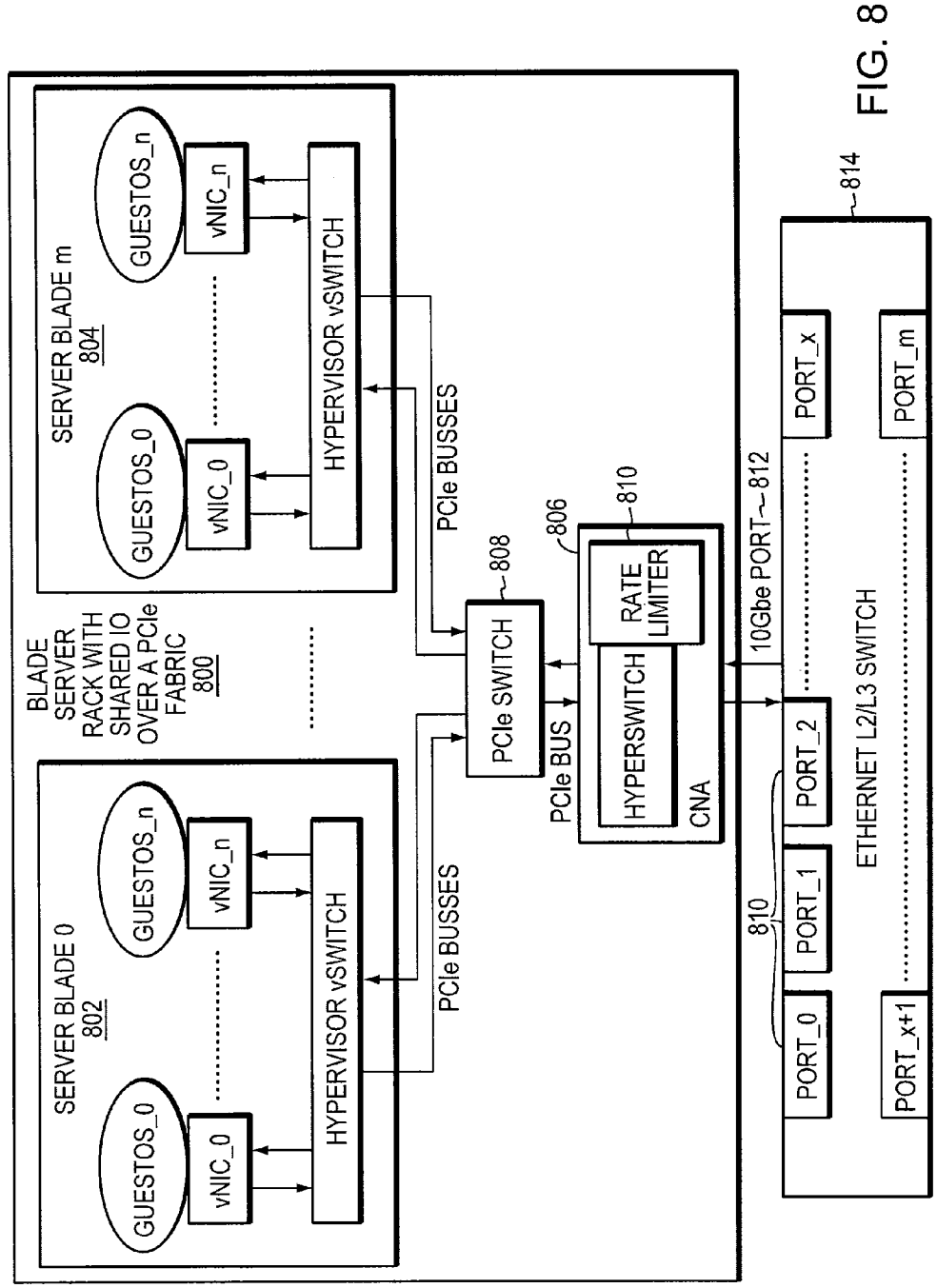
FIG. 8 illustrates a blade server rack including a converged network adaptor (CNA) shared by multiple server blades, the CNA including a rate limiter according to embodiments of the invention.

In another embodiment, the CNA of FIG. 7 may be incorporated in a blade server rack. As illustrated in FIG. 8, the blade server rack 800 may include multiple server blades 802, 804. The server blades 802, 804 have similar components as the server in FIG. 7 except that they do not include their own CNAs, but rather share a single CNA 806 in the blade server rack 800 using a PCIe switch 808. Preferably, the PCIe switch is a multi-root IOV aware switch. PCIe buses are used to connect the PCIe switch 808 to the server blades 802, 804 and to the CNA 806. An embodiment of the rate limiter 810 is incorporated in the CNA 806 and controls the outbound traffic from the server blades 802, 804 to the network. The server blades 802, 804 in the rack 800 communicate with other devices on the network through a 10GbE Port 812. As illustrated in FIG. 8, an Ethernet L2/L3 switch 814 is one of those devices that process traffic from and to the server blades 802, 804. The particular problems with congestion may occur at any of the ports 816 or inside of the Ethernet L2/L3 switch 814, or in ports or inside other external switches (not shown) coupled to the Ethernet L2/L3 switch 814. In response to the congestion, the switches send BCN messages to the CNA 806. For example, if the Ethernet L2/L3 switch 814 were detecting internal congestion, it would produce BCN messages that would be sent back to the CNA 806 through one of its ports 810. The BCN messages are then interpreted by firmware inside the CNA 806 to determine if particular flows or virtual machines are associated with the congestion. The rate limiter 810 then selectively controls the outbound packets based on which flow or virtual machine the packet is associated with. Even if no hypervisors are contained in the server blades 802, 804, and each blade processor is running only a single operating system, the rate limiter can perform an important function in controlling the congestion due to flows through the 10GbE port. In another embodiment, a blade server level rate limiter (not shown) may also be included. The server level rate limiter may control the amount of traffic in and out of each server.

Figure 9:
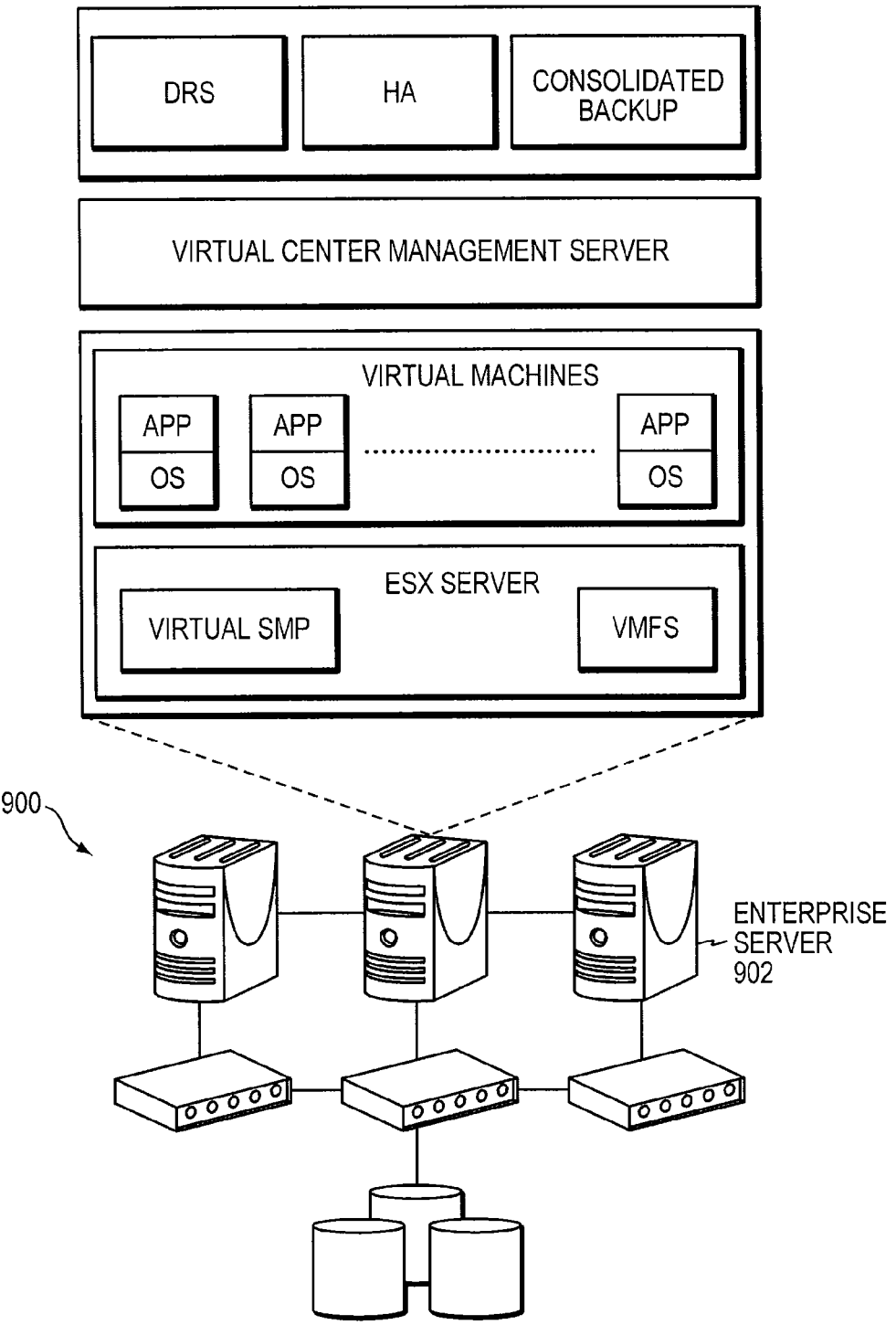
FIG. 9 illustrates an enterprise server network that includes the hardware switches according to an embodiment of the invention.

The PCIe switch 808 and the CNA 806 shown in FIG. 8 are preferably packaged together in a subassembly that may mount into one of the blade server chassis slots. The subassembly is preferably used as a part of a network with storage and other capabilities. FIG. 9 illustrates an example of an enterprise server network 900 that may include the subassembly according to an embodiment of the invention. A CNA using the rate limiter according to embodiments of the invention may be used in any of the enterprise servers 902 shown in FIG. 9. Although these enterprise servers 902 are shown as separate enclosures, they may be blades in a blade server chassis.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A system, comprising:
   hardware for implementing or supporting a rate limiter comprising logic, the rate limiter being configured to function as:
   a virtual machine rate limiter engine configured to rate limit first packets based on a first virtual machine rate limit of a first virtual machine associated with the first packets, and rate limit second packets based on a second virtual machine rate limit of a second virtual machine associated with the second packets;
   a flow rate limiter engine configured to rate limit the first packets based on a first flow rate limit of a first flow associated with the first packets, and rate limit the second packets based on a second flow rate limit of a second flow associated with the second packets; and
   a transmit engine configured to independently determine that the first virtual machine rate limit and the first flow rate limit allow for transmitting the first packets, and that the second virtual machine rate limit and the second flow rate limit allow for transmitting the second packets,
   wherein the transmit engine is in communication with the virtual machine rate limiter engine and the flow rate limiter engine, and manages the virtual machine rate limiter engine and the flow rate limiter engine.

2. The system of claim 1, wherein:
   the hardware is configured to activate rate limits at the rate limiter in response to a Backwards Congestion Notification (BCN).

3. The system of claim 1, further comprising a virtual machine profile table configured to include an allocated first virtual machine rate limit and a current first virtual machine rate for the first virtual machine, and an allocated second virtual machine rate limit and a current second virtual machine rate for the second virtual machine, wherein the virtual machine rate limiter engine is configured to compare the allocated first virtual machine rate limit with the current first virtual machine rate, and to compare the allocated second virtual machine rate limit with the current second virtual machine rate.

4. The system of claim 1, further comprising a flow profile table configured to include an allocated first flow rate limit and a current first flow rate for the first flow, and an allocated second flow rate limit and a current second flow rate for the second flow, wherein the flow rate limiter engine is configured to compare the allocated first flow rate limit and the current first flow rate, and to compare the allocated second flow rate limit and the current second flow rate.

5. The system of claim 1, wherein the transmit engine is further configured to independently determine that a first virtual pipe for transmitting the first packets has enough bandwidth to transmit the first packets, and that a second virtual pipe for transmitting the second packets has enough bandwidth to transmit the second packets.

6. The system of claim 5, wherein the first virtual pipe is selected for transmitting the first packets based on a first priority of the first packets, and the second virtual pipe is selected for transmitting the second packets based on a second priority of the second packets.

7. The system of claim 1, wherein the hardware implementing or supporting the rate limiter is a part of one of a converged network adapter, a host bus adapter, and a network interface card.

8. The system of claim 1, wherein the hardware implementing or supporting the rate limiter is incorporated in a server comprising a plurality of guest operating systems (OSs), each OS hosted on one of a plurality of virtual machines.

9. The system of claim 1, wherein the hardware implementing or supporting the rate limiter is incorporated in a server, and the transmit engine is configured to receive transmit descriptors from the server, the transmit descriptors identifying candidate packets for possible transmission.

10. The system of claim 9, wherein the transmit descriptor includes at least one of a media access control (MAC) source address, a MAC destination address, a virtual local area network (LAN) number, a priority field, a source internet protocol (I P) address, a destination IP address, a source port, a destination port, a virtual machine identification (10), and a flow 10.

11. The system of claim 10, wherein the flow 10 is determined by a transmit queue.

12. The system of claim 1, wherein the hardware implementing of supporting the rate limiter is incorporated in a network, the network being one of an Ethernet network, a Fibre Channel network, and a Fibre Channel over Ethernet network.

13. The system of claim 1 further comprising:
a network card that includes the hardware.

14. The system of claim 13 further comprising:
a server that includes the network card.

15. The system of claim 13 further comprising:
a blade server rack that includes the network card, wherein the blade server rack further comprises a plurality of server blades configured to share the network card.

16. The system of claim 15, wherein the blade server rack further comprises: a blade server level rate limiter configured to control traffic in and out of each of the plurality of server blades.

17. A method of rate limiting, the method comprising: controlling a transmission of a first candidate packet based on a first virtual machine rate limit of a first virtual machine associated with the first candidate packet, and a first flow rate limit of a first flow associated with the first candidate packet; and controlling a transmission of a second candidate packet based on a second virtual machine rate limit of a second virtual machine associated with the second candidate packet, and a second flow rate limit of a second flow associated with the second candidate packet,
wherein the transmissions of the first and second candidate packets are controlled independently, and the method further comprises;
operating a transmit engine to communicate with a virtual machine rate limiter engine that implements the first virtual machine rate limit; and
operating the transmit engine to communicate with a flow rate limiter engine that implements the first flow rate limit,
wherein the transmit engine manages the virtual machine rate limiter engine and the flow rate limiter engine.

18. The method of claim 17, further comprising obtaining a first transmit descriptor including information about the first candidate packet, and a second transmit descriptor including information about the second candidate packet.

19. The method of claim 17, further comprising:
accessing a profile table storing an allocated first virtual machine rate limit and a current first virtual machine rate for the first virtual machine;
accessing the profile table storing an allocated second virtual machine rate limit and a current second virtual machine rate for the second virtual machine;
comparing the allocated first virtual machine rate limit with the current first virtual machine rate; and
comparing the allocated second virtual machine rate limit with the current second virtual machine rate.

20. The method of claim 17, further comprising:
accessing a profile table storing an allocated first flow rate limit and a current first flow rate for the first flow;
accessing the profile table storing an allocated second flow rate limit and a current second flow rate for the second flow;
comparing the allocated first flow rate limit with the current first flow rate; and
comparing the allocated second flow rate limit with the current second flow rate.

21. The method of claim 17, further comprising:
determining a first priority associated with the first candidate packet;
determining a second priority associated with the second candidate packet;
identifying a first virtual pipe for transmitting the first candidate packet based on the first priority; and
identifying a second virtual pipe for transmitting the second candidate packet based on the second priority.

22. The method of claim 21, further comprising:
determining an available first bandwidth of the first virtual pipe;
determining an available second bandwidth of the second virtual pipe;
comparing a required first bandwidth required to transmit the first candidate packet with the available first bandwidth of the first virtual pipe; and
comparing a required second bandwidth required to transmit the second candidate packet with the available second bandwidth of the second virtual pipe.

23. The method of claim 17, wherein;
transmission of the first candidate packet is further based on a first server rate limit of a first server from which the first candidate packet is sent or received, and
transmission of the second candidate packet is further based on a second server rate limit of a second server from which the second candidate packet is sent or received,
wherein the first and second servers are two of a plurality of blade servers in a blade server rack.

24. A system, comprising:
hardware for implementing or supporting a rate limiter comprising logic, the rate limiter being configured to function as:
  a virtual machine rate limiter engine configured to rate limit first packets based on a first virtual machine rate limit of a first virtual machine associated with the first packets, and rate limit second packets based on a second virtual machine rate limit of a second virtual machine associated with the second packets;
  a flow rate limiter engine configured to rate limit the first packets based on a first flow rate limit of a first flow associated with the first packets, and rate limit the second packets based on a second flow rate limit of a second flow associated with the second packets; and
  a transmit engine in communication with the virtual machine rate limiter engine and the flow rate limiter engine, wherein the transmit engine is configured to:
  manage the virtual machine rate limiter engine and the flow rate limiter engine,
  independently determine that the first virtual machine rate limit and the first flow rate limit allow for transmitting the first packets, and that the second virtual machine rate limit and the second flow rate limit allow for transmitting the second packets, and
  transmit the first and second packets.

25. A method of rate limiting, the method comprising:
identifying a first candidate packet for transmission;
identifying a second candidate packet for transmission;
identifying a first virtual machine associated with the first candidate packet;
identifying a second virtual machine associated with the second candidate packet;
identifying a first flow associated with the first candidate packet;
identifying a second flow associated with the second candidate packet;
controlling a transmission of the first candidate packet based on a first virtual machine rate limit of the first virtual machine and a first flow rate limit of the first flow;
controlling a transmission of the second candidate packet based on a second virtual machine rate limit of the second virtual machine and a second flow rate limit of the second flow;
transmitting the first candidate packet; and
transmitting the second candidate packet,
wherein the transmissions of the first and second candidate packets are controlled independently, and the method further comprises;
operating a transmit engine to communicate with a virtual machine rate limiter engine that implements the first virtual machine rate limit; and
operating the transmit engine to communicate with a flow rate limiter engine that implements the first flow rate limit,
wherein the transmit engine manages the virtual machine rate limiter engine and the flow rate limiter engine.

26. A system, comprising:
hardware for implementing or supporting a rate limiter comprising logic, the rate limiter being configured to function as:
  a virtual machine rate limiter engine configured to rate limit first packets based on a first virtual machine rate limit of a first virtual machine associated with the first packets, and rate limit second packets based on a second virtual machine rate limit of a second virtual machine associated with the second packets;
  a flow rate limiter engine configured to rate limit the first packets based on a first flow rate limit of a first flow associated with the first packets, and rate limit the second packets based on a second flow rate limit of a second flow associated with the second packets; and
  a transmit engine that rate limits the packets in response to a virtual pipe for transmitting the packets, and the transmit engine in communication with the virtual machine rate limiter engine and the flow rate limiter engine, wherein the transmit engine is configured to:
  manage the virtual machine rate limiter engine and the flow rate limiter engine,
  independently determine that the first virtual machine rate limit and the first flow rate limit allow for transmitting the first packets, and that the second virtual machine rate limit and the second flow rate limit allow for transmitting the second packets,
  independently determine that a first virtual pipe for transmitting the first packets has enough bandwidth to transmit the first packets, and that a second virtual pipe for transmitting the second packets has enough bandwidth to transmit the second packets, and
  transmit the first and second packets.

27. A method of rate limiting, the method comprising:
identifying a first candidate packet and a second candidate packet for transmission;
identifying a first virtual machine associated with the first candidate packet, and a second virtual machine associated with the second candidate packet;
identifying a first flow associated with the first candidate packet, and a second flow associated with the second candidate packet;
identifying a first virtual pipe for potential transmission of the first candidate packet, and a second virtual pipe for potential transmission of the second candidate packet;
controlling a transmission of the first candidate packet based on a first virtual machine rate limit of the first virtual machine, a first flow rate limit of the first flow and a first bandwidth of the first virtual pipe;
controlling a transmission of the second candidate packet based on a second virtual machine rate limit of the second virtual machine, a second flow rate limit of the second flow and a second bandwidth of the second virtual pipe; and
transmitting the first candidate packet and the second candidate packet,
wherein the transmissions of the first and second candidate packets are controlled independently, and the method further comprises;
operating a transmit engine to communicate with a virtual machine rate limiter engine that implements the first virtual machine rate limit; and
operating the transmit engine to communicate with a flow rate limiter engine that implements the first flow rate limit,
wherein the transmit engine manages the virtual machine rate limiter engine and the flow rate limiter engine.

28. The system of claim 1, wherein the rate limiter is further configured to function as a server rate limiter engine configured to rate limit the first packets based on a first server rate limit of a first server associated with the first packets, and to rate limit the second packets based on a second server rate limit of a second server associated with the second packets, the first and second servers being two of a plurality of servers residing in a blade server chassis.

29. A method of rate limiting, the method comprising:
rate limiting first packets based on a first virtual machine rate limit of a first virtual machine associated with the first packets;
rate limiting second packets based on a second virtual machine rate limit of a second virtual machine associated with the second packets;
rate limiting the first packets based on a first flow rate limit of a first flow associated with the first packets;
rate limiting the second packets based on a second flow rate limit of a second flow associated with the second packets; and
independently determining that the first virtual machine rate limit and the first flow rate limit allow for transmitting the first packets, and that the second virtual machine rate limit and the second flow rate limit allow for transmitting the second packets, and the method further comprises;
operating a transmit engine to communicate with a virtual machine rate limiter engine that implements the first virtual machine rate limit; and
operating the transmit engine to communicate with a flow rate limiter engine that implements the first flow rate limit,
wherein the transmit engine manages the virtual machine rate limiter engine and the flow rate limiter engine.

30. A non-transitory machine-readable medium comprising instructions that, when executed by one or more processors, cause a rate limiter to perform a method comprising:
rate limiting first packets based on a first virtual machine rate limit of a first virtual machine associated with the first packets;
rate limiting second packets based on a second virtual machine rate limit of a second virtual machine associated with the second packets;
rate limiting the first packets based on a first flow rate limit of a first flow associated with the first packets;
rate limiting the second packets based on a second flow rate limit of a second flow associated with the second packets; and
independently determining that the first virtual machine rate limit and the first flow rate limit allow for transmitting the first packets, and that the second virtual machine rate limit and the second flow rate limit allow for transmitting the second packets, and the method further comprises;
operating a transmit engine to communicate with a virtual machine rate limiter engine that implements the first virtual machine rate limit; and
operating the transmit engine to communicate with a flow rate limiter engine that implements the first flow rate limit,
wherein the transmit engine manages the virtual machine rate limiter engine and the flow rate limiter engine.

31. A non-transitory machine-readable medium comprising instructions that, when executed by one or more processors, cause a rate limiter to perform a method comprising:
controlling a transmission of a first candidate packet based on a first virtual machine rate limit of a first virtual machine associated with the first candidate packet, and a first flow rate limit of a first flow associated with the first candidate packet; and
controlling a transmission of a second candidate packet based on a second virtual machine rate limit of a second virtual machine associated with the second candidate packet, and a second flow rate limit of a second flow associated with the second candidate packet,
wherein the transmissions of the first and second candidate packets are controlled independently, and the method further comprises;
operating a transmit engine to communicate with a virtual machine rate limiter engine that implements the first virtual machine rate limit; and
operating the transmit engine to communicate with a flow rate limiter engine that implements the first flow rate limit,
wherein the transmit engine manages the virtual machine rate limiter engine and the flow rate limiter engine.

* * * * *